(12) United States Patent
Lutjen et al.

(10) Patent No.: US 8,716,623 B2
(45) Date of Patent: May 6, 2014

(54) CORE RUNOUT CEILING FOR TURBINE COMPONENTS

(75) Inventors: Paul M. Lutjen, Kennebunkport, ME (US); Kevin J. Ryan, Alfred, ME (US); Paul S. Bean, Wells, ME (US); Paul C. McClay, South Berwick, ME (US)

(73) Assignee: United Technologies Corporation, Hartford, CT (US)

( * ) Notice: Subject to any disclaimer, the term of this patent is extended or adjusted under 35 U.S.C. 154(b) by 511 days.

(21) Appl. No.: 13/020,845

(22) Filed: Feb. 4, 2011

(65) Prior Publication Data

US 2012/0201662 A1 Aug. 9, 2012

(51) Int. Cl.
*B23K 26/00* (2006.01)
*B23K 26/20* (2006.01)

(52) U.S. Cl.
USPC .................. 219/121.64; 219/121.14; 29/889.1

(58) Field of Classification Search
USPC ............. 219/121.13, 121.14, 121.63, 121.64;
29/888.01–889.722; 228/182;
416/223 R, 244 R, 248; 415/115, 232
See application file for complete search history.

(56) References Cited

U.S. PATENT DOCUMENTS

| | | | | |
|---|---|---|---|---|
| 1,966,104 A | * | 7/1934 | Noack | 416/96 R |
| 2,891,307 A | * | 6/1959 | Betteridge | 29/423 |
| 5,553,370 A | * | 9/1996 | Pepe | 29/889.1 |
| 6,332,272 B1 | * | 12/2001 | Sinnott et al. | 29/889.1 |

* cited by examiner

*Primary Examiner* — Samuel M Heinrich
(74) *Attorney, Agent, or Firm* — Carlson, Gaskey & Olds, PC

(57) ABSTRACT

A method of closing off a mold plug opening in a turbine component includes the steps of inserting a weld member into an opening to be closed, and to abut a necked portion within a passage leading from the opening. Heat is applied to the weld member, such that a surface of the weld member in contact with the necked portion liquefies, and such that the weld member adheres to the necked portion, closing off the opening. The weld member and application of heat are selected such that the entirety of the weld member does not liquefy, but remains in the opening, without ever having liquefied. A turbine component formed by the method is also disclosed.

10 Claims, 4 Drawing Sheets

CORE RUNOUT CEILING FOR TURBINE COMPONENTS

BACKGROUND

This application relates to welding technique that reduces cracking due to welding operations to close off the end of internal cores in turbine components.

Gas turbine engines are known and typically include a compressor which compresses air and delivers it into a combustion chamber. The air is mixed with fuel and combusted in the combustion chamber. Products of this combustion pass downstream over turbine rotors.

The rotors include a number of components, including removable blades, and seals which sit outwardly of the blades. The products of combustion can be extremely hot, and thus these components must be capable of withstanding high temperatures. One design feature to address the high temperature is to provide cooling air through internal passages in the blades and the seals.

To form the internal passages, lost cores are utilized. A lost core is typically a product shaped to mimic the shape of the cooling passage that is desired within the final turbine components. The turbine component is cast around the core product, and the core product is then removed in some manner, such as being leached, leaving the empty space for the cooling passage.

In one lost core technique, the cores are supported such that one end of the core is structurally mounted within a cast mold. As a machining step, that end of the core passage is closed off after the component has been cast. In the existing method, weld wire is manually extended into the passage, and welded to fill the passage outwardly toward the final outer face of the turbine component. The turbine component is then machined downwardly to a final face.

The above method applies a great deal of heat to the turbine component around the area of the weld wire. Cracking often results.

SUMMARY

A method of closing off a mold plug opening in a turbine component includes the steps of inserting a weld member into an opening to be closed, and to abut a necked portion within a passage leading from the opening. Heat is applied to the weld member, such that a surface of the weld member in contact with the necked portion liquefies, and such that the weld member adheres to the necked portion, closing off the opening. The weld member and application of heat are selected such that the entirety of the weld member does not liquefy, but remains in the opening, without ever having liquefied. A turbine component formed by the method is also disclosed.

These and other features of the present invention can be best understood from the following specification and drawings, of which the following is a brief description.

DETAILED DESCRIPTION

Figure 1:
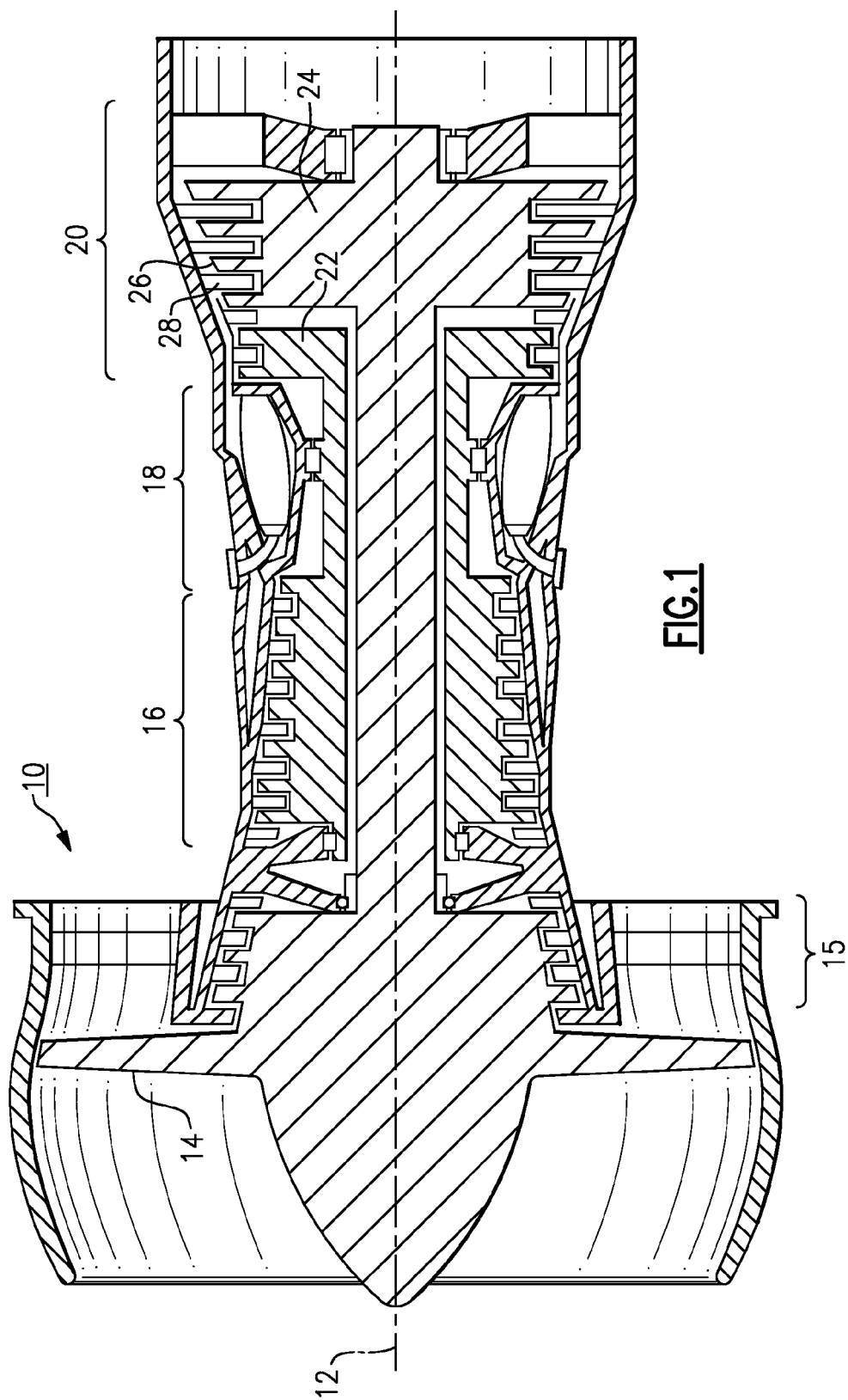
FIG. 1 shows a schematic of a turbine engine.

A gas turbine engine 10, such as a turbofan gas turbine engine, circumferentially disposed about an engine centerline, or axial centerline axis 12 is shown in FIG. 1. The engine 10 includes a fan 14, compressor sections 15 and 16, a combustion section 18 and a turbine 20. As is well known in the art, air compressed in the compressor 15/16 is mixed with fuel and burned in the combustion section 18 and expanded in turbine 20. The turbine 20 includes rotors 22 and 24, which rotate in response to the expansion. The turbine 20 comprises alternating rows of rotary airfoils or blades 26 and static airfoils or vanes 28. In fact, this view is quite schematic, and blades 26 and vanes 28 are actually removable. It should be understood that this view is included simply to provide a basic understanding of the sections in a gas turbine engine, and not to limit the invention. This invention extends to all types of turbine engines for all types of applications.

Figure 2:
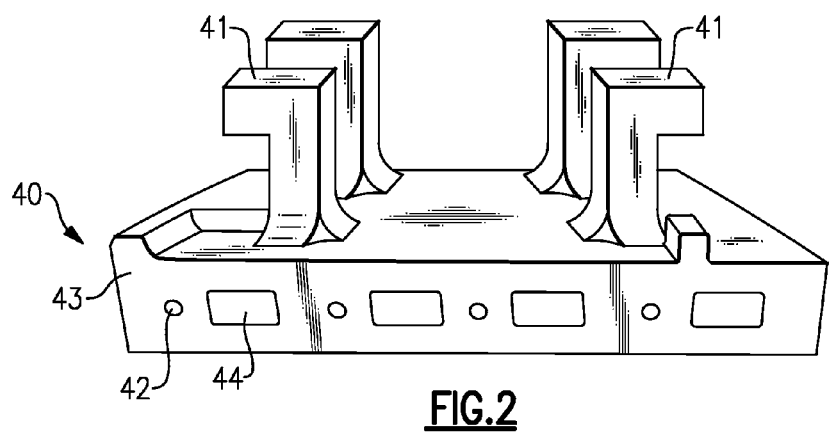
FIG. 2 shows an intermediate product.

FIG. 2 shows an intermediate blade outer air seal 40. A blade outer air seal is a component which is positioned to fit directly outwardly of the radially outer end of the turbine blades, such as blades 26 (FIG. 1).

As with many turbine components, a blade outer air seal has internal passages that are formed by lost core techniques. Thus, core plugs are mounted into a mold, and the component is then cast around the core plugs. The core plugs may then be removed in some manner, leaving internal cooling passages. As shown in FIG. 2, there are large ends or openings 44 of the cooling passages, and smaller openings or ends 42. The enlarged ends 44 provide a connection for the internal features to the mold. While producing greater control for core position, these must be closed for proper cooling air distribution.

Hooks 41 serve to allow the final blade outer air seal to be mounted within a gas turbine engine. A rough face 43 of the intermediate or as-cast blade outer air seal 40 will be machined away in a subsequent step.

Figure 3:
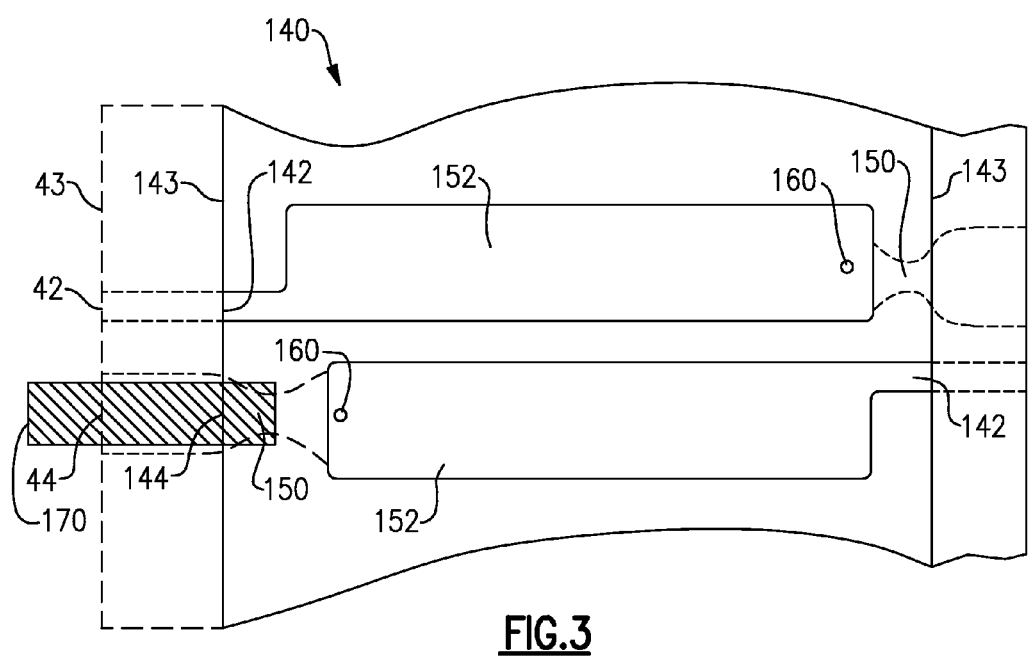
FIG. 3 is a partial view showing the final product.

FIG. 3 shows an end surface or face 143 of the final blade outer air seal 140. As shown, the location 144 associated with the intermediate large end 44 is plugged with material 150. The end 142 remains as associated with the original holes or ends 42.

In addition, inlets 160 are provided to bring cooling air into the passages 152, and pass the cooling air outwardly towards the openings 142, which serve as outlets. The inlets 160 are shown schematically, and can be at any number of locations.

The installation and welding of a pin 170 to the substrate 140 requires less heat than in the prior art. The weld can be either a perimeter weld of the faces being joined or a liquefying of the exposed portion of the pin to a controlled depth. Suitable geometries are provided that reduce the perimeter and/or volume of material being liquefied, which reduces heat input to the joint and provide a means to prevent a pin 170, from entering the internal passage 152.

Figure 4A:
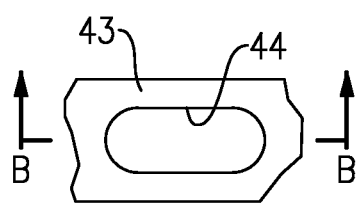
FIG. 4A is an end view of one portion of the intermediate product.
Figure 4B:
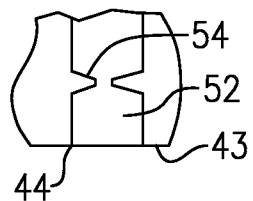
FIG. 4B is a cross-sectional view along lines B-B of FIG. 4A.

As shown in FIG. 4A, the opening 44 may be somewhat oval, or actually rectangular as shown in FIG. 2. As shown in FIG. 4B, the original as-cast passage 52 necks down at 54 to a small area.

Figure 5A:
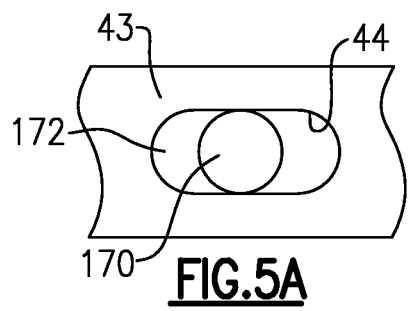
FIG. 5A shows a first step in a manufacturing process.
Figure 5B:
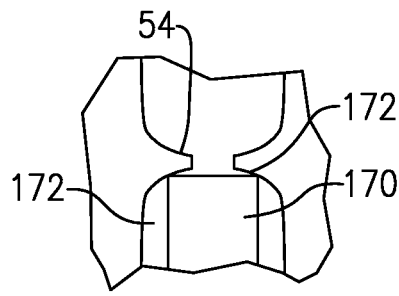
FIG. 5B shows another view of the FIG. 5A step.

As shown in FIG. 5A, to plug the necked area 54, and form the material 150, a weld member, here a pin 170, is inserted into the opening 44. The weld member may be formed of nickel-base, cobalt-based, or other appropriate alloy. As shown, the pin may typically be smaller than the opening 44, and have spaces 172, such as on radial extents of a cylindrical pin 170. The pin 170 is shown in FIG. 5B abutting a face 172 of the necked area 54. The weld pin 170 is generally cylindrical, although many other shapes could be utilized. The opening 44 is elongate and extends beyond an extent of the pin 170 on opposed sides of the pin. The pin 170 is closely received within a shorter dimension of the openings 44, as shown.

Figure 6:
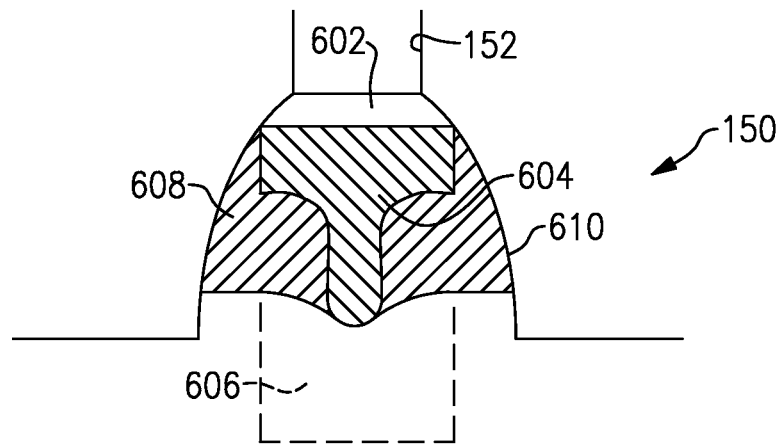
FIG. 6 shows the final shape of the component.

FIG. 6 shows the final configuration of the material 150. The pin will generally liquefy in an area shown by 606. A forward portion 604 may remain solid. The liquefied areas move to surround the solid portion. Of course, this is merely an example of one embodiment. The liquefied material 608 will flow to surround the solid pin portion 604, and completely seal the opening 610. There may be a space 602 forward of the solid portion 604.

This welding may be automated such as by holding the part and pin in appropriate fixtures during the automated welding to close off the several openings 44.

The blade outer air seal is then subsequently machined to reach the final face 143.

Figure 7:
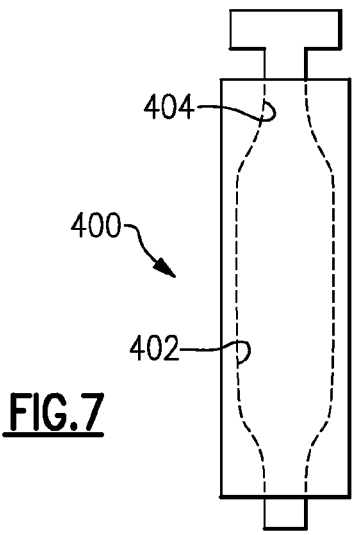
FIG. 7 shows another embodiment.

FIG. 7 shows a vane 400 which can incorporate a cooling channel 402 having a neck portion 404. The invention can be utilized in the vane member 400 in a manner similar to that described above.

Figure 8A:
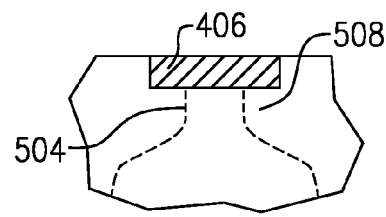
FIG. 8A shows one optional embodiment.
Figure 8B:
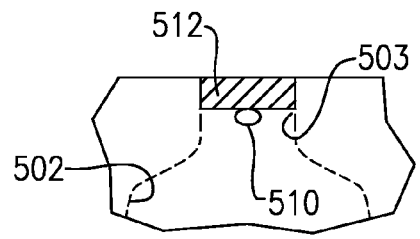
FIG. 8B shows another optional embodiment.
Figure 8C:
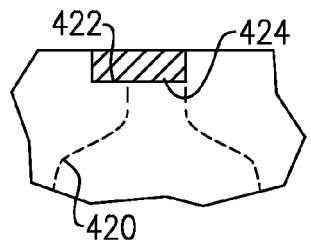
FIG. 8C shows yet another optional embodiment.

FIGS. 8A-8C disclose various ways of improving the method of this application, such as by providing a stop surface for the pin 170. Thus, as shown in FIG. 8A, the necked portion 504 of a cooling channel 502 can be provided adjacent to a T-shaped surface. The material 406 is then properly received from pin 170 to close off the necked portion 504. The T-shaped surface 508 provides a stop for the pin.

FIG. 8B shows another cooling channel option wherein a cross beam 510 is cast into the original part, and will provide the stop for the pin such that the material 502 does close off the necked portion 503.

FIG. 8C shows an offset embodiment, wherein a stop surface 422 is formed spaced from a center axis of cooling channel 420. The offset area 422 will provide a stop for the pin, such that the material 424 does close off the necked portion.

While the invention is disclosed in a blade outer air seal and a vane, other turbine components such as turbine blades may benefit from this invention. While any number of materials can be utilized, the pin 170 may be formed of a nickel-base, cobalt-based or other suitable alloy. Of course, the turbine component is typically formed of a distinct material. Example materials for the turbine component may be nickel-base, cobalt-based. Thus, the material 150 may be some combination of the two distinct materials forming the pin 170 and the blade outer air seal.

With this invention, much less heat is applied to the location of the plug 150. Thus, the amount of cracking that can be expected will be greatly reduced.

Although embodiments of this invention have been disclosed, a worker of ordinary skill in this art would recognize that certain modifications would come within the scope of this invention. For that reason, the following claims should be studied to determine the true scope and content of this invention.

What is claimed is:

1. A method of closing off a mold plug opening in a turbine component comprising the steps of:
    (a) inserting a weld member into an opening to be closed, and to abut a necked portion within a passage leading from the opening; and
    (b) applying heat to the weld member, such that a surface of the weld member in contact with the necked portion liquefies, and such that the weld member adheres to the necked portion, closing off the opening, and the weld member and application of heat being selected such that the entirety of the weld member does not liquefy, but a portion of the weld member remains in the opening, without ever having liquefied.

2. The method as set forth in claim 1, wherein said application of heat being one of laser or electron beam welding.

3. The method as set forth in claim 1, wherein said weld member is smaller than said opening.

4. The method as set forth in claim 3, wherein the opening is longer than the weld member in at least one dimension such that there is clearance between the opening and the weld member on opposed sides of the weld member.

5. The method as set forth in claim 4, wherein said weld component is generally cylindrical, and said opening is elongate extending beyond an extent of said weld member on opposed sides of said weld member, with said weld member being closely received within a shorter dimension of said opening.

6. The method as set forth in claim 1, wherein said application of heat is performed by an automated weld machine.

7. The method as set forth in claim 6, wherein the turbine component includes a plurality of mold plug openings which are closed by steps (a) and (b).

8. The method as set forth in claim 1, wherein said turbine component is a blade outer air seal, and said passage is a cooling passage within a body of the blade outer air seal.

9. The method as set forth in claim 1, wherein said turbine component is a vane, and said passage is a cooling passage within a body of the vane.

10. A method of closing off a mold plug opening in a turbine component comprising the steps of:
    (a) inserting a weld member into an opening to be closed, and to abut a necked portion within a passage leading from the opening;
    (b) applying heat to the weld member with one of laser or electron beam welding, such that a surface of the weld member in contact with the necked portion liquefies, and such that the weld member adheres to the necked portion, closing off the opening, and the weld member and welding technique being selected such that the entirety of the weld member does not liquefy, but a portion of the weld member remains in the opening, without ever having liquefied, said weld member being smaller than said opening; and
    (c) said welding technique being automated, and there being a plurality of passages within the turbine component which are closed by the method of steps (a) and (b).

* * * * *